Patented Sept. 2, 1947

2,426,604

UNITED STATES PATENT OFFICE 2,426,604

REMOVAL OF ACETYLENIC HYDROCARBONS FROM DIOLEFINE-CONTAINING MIXTURES

Ludo K. Frevel, Midland, Mich., assignor to The Dow Chemical Company, Midland, Mich., a corporation of Michigan No Drawing. Application July 17, 1944, Serial No. 545,392

7 Claims. (Cl. 260—681.5)

This invention concerns a method and certain catalysts for the treatment of hydrocarbon mixtures comprising a diolefine and another at least equally unsaturated hydrocarbon to hydrogenate selectively and thereby remove the latter without destruction of more than a minor amount of the diolefine. It pertains especially to such method and catalysts for the treatment of hydrocarbon mixtures comprising a conjugated diolefine to remove therefrom other hydrocarbons which are alpha-beta-unsaturated and which have no hydrogen atom attached to the beta carbon atom.

It is known that diolefines, and particularly conjugated diolefines are produced in dilute form, but in large quantities, in various processes for the pyrolysis of petroleum fractions and other hydrocarbon starting materials. The diolefine-containing mixtures obtained in such processes usually comprise a variety of hydrocarbons other than the diolefines, and separation of the latter in a form suitable for use in the preparation of synthetic rubber has proven difficult. For instance, cracked-oil gas, which is a well-known source of diolefines, usually comprises paraffinic hydrocarbons ranging from methane to hexane; olefines such as ethylene, propylene, butylenes, amylenes, and hexenes; diolefines such as allene, butadiene-1,3, methylallene, isoprene, and piperylene; and a small but appreciable amount of acetylenic hydrocarbons such as acetylene, methylacetylene, ethyl acetylene, and vinyl acetylene, etc.

Although such mixture may be distilled to obtain fractions consisting for the most part of hydrocarbons having the same number of carbon atoms in the molecule and the diolefine content of each fraction may be concentrated by usual purification procedures, e. g. by extraction with solvents, the acetylenic hydrocarbons and other highly unsaturated hydrocarbon impurities of close to the same boiling point as the diolefines tend to accompany the latter during such treatments. For instance, butadiene-1.3 which has been recovered from cracked-oil gas by such conventional treatments usually retains a minor amount, e. g. less than 0.1 molecular equivalent, of acetylene homologues such as methyl-acetylene, ethyl-acetylene, and vinyl-acetylene, and may also retain a small but appreciable proportion of an unconjugated diolefine such as allene or methyl-allene. Such impurities are objectionable when the diolefine is to be employed in the production of synthetic rubber. Although certain treatments, e. g. with agents capable of forming metal acetylides, are known whereby the acetylenic hydrocarbons may be removed, such treatments are expensive or difficult to carry out and are not well suited to commercial practice. Hydrogenation of the hydrocarbons with usual hydrogenation catalysts, even when carried out using hydrogen in an amount chemically equivalent to the acetylenes, ordinarily results in destruction of a considerable part of the diolefine.

It is an object of this invention to provide a simple, inexpensive method whereby vapor mixtures comprising a diolefine and, as an impurity incident to manufacture of the diolefine, a minor amount of an alpha-beta-unsaturated hydrocarbon containing no hydrogen atom on the beta carbon atom may be treated to hydrogenate such impurity selectively without excessive loss or destruction of the diolefine. Another object is to provide hydrogenation catalysts which are suitable for use in the process. Other objects will be apparent from the following description of the invention.

In order to be suitable for the purpose it is important that the used catalyst be readily regenerated, e. g. by successive oxidation and reduction treatments, to render it again active. During use as a catalyst for the hydrogenation of hydrocarbons, a finely divided metal gradually loses its activity, e. g. because of poisoning by the sulphur compounds usually associated with the hydrocarbons or because of accumulation on the catalyst of non-volatile organic or carbonaceous substances. The removal by oxidation of accumulated sulphur from the finely divided nickel often used as a catalyst is difficult. Also, most finely divided individual metals, when oxidized to remove such impurities and thereafter reduced with hydrogen, tend to increase in crystal size during the reduction. Such crystal growth causes a reduction in the catalytic activity.

I have found that although a conjugated diolefine such as butadiene-1.3 and alpha-beta-unsaturated hydrocarbons containing no hydrogen on the beta carbon atom, e. g. methyl-acetylene and allene, are equally unsaturated, as regards the amount of bromine which may be added to the molecule, they nevertheless differ appreciably in resistance to reaction with hydrogen. In general, I find that hydrogen may be reacted more readily with an alpha-acetylene than with an alpha-beta-diolefine, and more readily with the latter than with a conjugated diolefine. However, all such highly unsaturated hydrocarbons are capable of undergoing other chemical reactions, e. g. polymerization and/or carbonization, in the presence of hydrogenation catalysts. The hydrogenation methods and catalysts heretofore known are not satisfactory for the selective hydrogenation of one such highly unsaturated hydrocarbon, e. g. an acetylene, in the presence of another, e. g. a diolefine, without considerable destruction of the latter.

I have discovered an entire series of hydrogenation catalysts which are highly selective in causing the hydrogenation of certain highly unsaturated hydrocarbons in the presence of others and have also discovered the conditions under which such catalysts may be employed to remove from a diolefine an acetylene or other alpha-beta-unsaturated hydrocarbon, e. g. allene, having no hydrogen atom on the beta carbon atom.

The new hydrogenation catalysts consist essentially of finely divided copper or iron in intimate admixture with a minor amount of one or more other finely divided metals which are themselves active hydrogenation catalysts. Peculiarly, finely divided iron or copper, although known as catalysts for other hydrogenation reactions, have not proven to be effective as catalysts for the vapor phase hydrogenation of such highly unsaturated hydrocarbon impurities. Apparently, the temperature necessary for hydrogenation in the presence of these individual metals is above that required for decomposition of the highly unsaturated hydrocarbons. On the other hand, nickel usually causes the concurrent hydrogenation of acetylenes and diolefines and frequently promotes thermal decomposition, e. g. carbonization of such hydrocarbons. However, by forming an intimate mixture of finely divided copper or iron with a minor amount of one or more other finely divided metals, the oxides of which are reducible by hydrogen at temperatures below 550° C., there is obtained a catalyst mixture which is highly selective in action and which permits the ready hydrogenation of one unsaturated hydrocarbon in the presence of another equally unsaturated hydrocarbon that is only slightly less susceptible to hydrogenation. These particular mixtures of metals are, when necessary, readily reactivated, e. g. to remove accumulated carbon, non-volatile organic substances, or sulphur compounds, by the aforementioned successive oxidation and reduction treatments. During the step of reducing the metal oxides with hydrogen little, if any, crystal growth appears to take place.

For the purpose of this invention, the catalyst mixtures are prepared so as to contain between 85 and 99.9, preferably between 90 and 97, per cent by weight of one of the metals iron and copper and between 15 and 0.1, preferably between 10 and 3, per cent of another metal, the oxide of which is reducible with hydrogen at temperatures below 550° C. Examples of metals which may be employed together with the copper or iron in forming the mixed metal catalyst are chromium, cobalt, magnanese, nickel, vanadium, titanium, molybdenum, cadmium, zinc, silver, etc., and also mixtures of such metals. Peculiarly, although each of the metals copper and iron, when used alone, is substantially inactive as a catalyst for the hydrogenation of the homologues of acetylene, either of such metal may be rendered highly effective for the purpose by having intimately admixed therewith a minor amount of the other metal.

It should be mentioned that the catalysts containing copper as the principal metal ingredient, are not well adapted to the treatment of hydrocarbon mixtures containing an appreciable amount, e. g. more than 0.1 per cent by weight, of acetylene, $C_2H_2$, since copper, at elevated temperatures, promotes the conversion of acetylene to the solid or tarry substance known as cuprene. This restriction does not apply to the catalysts containing iron as the principal metal ingredient. The hydrocarbon-fractions containing diolefines are usually freed, e. g. by distillation, of acetylene prior to employment in the present process. The homologues of acetylene which are retained in such fractions may selectively be hydrogenated in the presence of any of the catalysts provided by the invention.

The catalysts are preferably employed in dispersed form on a substantially inert carrier material such as aluminum silicate, brick, stoneware, pumice, or porous silica, etc. Usually the supported catalyst is prepared so as to contain from 10 to 30 per cent by weight of the mixture of metals, but it may contain such metals in smaller or greater proportions.

The supported catalyst is ordinarily prepared by immersing the supporting material in an aqueous solution of the nitrates of the metals of which the catalyst is to be composed, thereafter removing and drying the supporting material, heating it in air to convert the metal nitrates into the corresponding oxides, and reducing the latter with hydrogen. The step of roasting to convert the metal nitrates to oxides is usually accomplished at temperatures between 550° and 700° C., preferably at 600–650° C., but it may be carried out at somewhat lower or at higher temperatures. Reduction of the metal oxides is carried out at temperatures below 550° C., and usually between 250° and 350° C., but this step also may be accomplished at lower or higher temperatures. Complete reduction of the metal oxides to the free metal is not in all instances necessary. For instance, when using the catalysts containing iron as the principal metal ingredient, it frequently happens that only about one-half or two-thirds of the iron oxide is reduced to the metal during the step of reducing the metal oxides with hydrogen. However, the oxides of most of the metals which may be employed as ingredients of the catalyst are readily reducible; hence, in most instances the metal oxides are reduced nearly completely to the free metals.

The supported catalysts may, if desired, be prepared in other ways. For instance, they may be prepared by immersing the supporting material in a solution of organic salts, e. g. formates or acetates, etc., of the metals to be employed as the catalyst ingredients. Either water or a volatile organic liquid such as acetic acid, acetone, or dioxane, etc., may be used as the solvent for such salts, the preferred medium being dependent, of course, on the particular salts employed. Thereafter the supporting material may be removed from the solution and dried by evaporating the solvent. The metal salts which remain deposited on the supporting material are then oxidized, e. g. by heating in a current of air at temperatures in the order of 500°–700° C., after which the residual metal oxides are reduced with hydrogen. Still other ways of forming a deposit of the finely divided and intimately mixed metals on the supporting material will be apparent.

In general, the catalysts are employed at temperatures below 300° C., and preferably below 250° C., in the treatment of diolefine-containing mixtures to remove therefrom highly unsaturated hydrocarbon impurities such as those hereinbefore mentioned. At higher temperatures, in the presence of the catalysts, diolefines undergo chemical reactions such as hydrogenation, polymerization and/or carbonization, to an objectionable extent. It will be understood that the maximum temperatures at which the catalysts may satisfactorily be used vary somewhat with the different catalysts and with changes in the rate of vapor flow, the depth of the catalyst bed, etc. In practice, the selective hydrogenation is usually carried out at temperatures below 225° C.

The minimum temperatures at which the catalysts may be used for the selective hydrogenation, and therefore the ranges of temperatures over which they may be used, vary with changes in the kinds and proportions of the metals of which the catalysts are composed. In general, the minimum temperature at which a catalyst is satisfactorily active decreases with increase in the proportion of a catalytic metal, other than the copper or iron employed as the principal ingredient of the catalyst, which is admixed with the copper or iron. The minimum temperature at which the hydrogenation may satisfactorily be carried out is also dependent in part upon the rate at which the reaction mixture is passed over the catalyst, i. e. the minimum temperature for practical operation usually becomes lower with decrease in the rate of vapor flow. In comparative experiments, using catalytic mixtures of copper and nickel supported on porous alpha-cristobalite, such metal mixture consisting of 99.91 per cent copper and 0.09 per cent nickel was satisfactorily active at 205° C. and above, whereas a mixture of 94.7 per cent copper and 5.3 per cent nickel was quite active at approximately 100° C. and was satisfactorily active at 135° C. Similarly, the minimum practical operating temperatures for catalytic mixtures consisting of a major amount of iron and a minor amount of copper decreased with increase in the proportion of the copper, and the minimum practical operating temperatures for mixtures consisting of a major amount of copper and a minor amount of iron decreased with increase in the proportion of the iron. However, the admixture with the copper or iron, employed as the principal catalyst ingredient, of a large proportion of another catalytic metal often results in a catalytic mixture which is not satisfactorily selective and which promotes destruction, e. g. by hydrogenation, polymerization or carbonization, of a considerable amount of the diolefine in the hydrocarbon mixture under treatment. It is for these reasons that the catalyst is prepared so as to contain, together with the principal copper or iron ingredient, between 0.1 and 15, and preferably between 3 and 10, per cent by weight of one or more other metals.

The catalysts provided by the invention permit the selective hydrogenation of an alpha-acetylene in the presence of either a conjugated or an unconjugated diolefine, and they permit the selective hydrogenation of an alpha-beta-diolefine, e. g. propadiene or butadiene-1.2, in the presence of a conjugated diolefine. It follows, of course, that they permit the concurrent hydrogenation in a single step of both an alpha-acetylene and an alpha-beta-diolefine in the presence of a conjugated diolefine to render the latter substantially free of the equally unsaturated hydrocarbon impurities.

In order to hydrogenate an alpha-acetylene selectively in the presence of an alpha-beta-diolefine without appreciable destruction of the latter, it is necessary that the mixture, when passed over the catalyst, contain hydrogen in not more than 10 per cent excess over the amount theoretically required to reduce the acetylene to a corresponding mono-olefine. In practice the hydrogen is employed in the amount theoretically required for such reduction of the acetylene. Also, it is desirable that the reduction be carried out at a temperature not greatly in excess of that necessary for satisfactorily rapid reaction, since the tendency for the diolefine to react becomes greater with rise in the temperature. However, the temperature may be varied considerably within the ranges hereinbefore stated, and yet obtain satisfactory results. Thus, the invention may be applied in treating a mixture of allene and methyl-acetylene to reduce and remove the latter and obtain the allene in more readily purifiable form.

Also, in order to hydrogenate selectively either an alpha-beta-diolefine, or both an alpha-beta-diolefine and an acetylene, in the presence of a conjugated diolefine without appreciable destruction of the latter, it is necessary that the mixture, when passed over the catalyst, contain hydrogen in amount not exceeding by more than 10 per cent (and preferably corresponding to) that theoretically required to reduce such unsaturated hydrocarbons other than the conjugated diolefine to simple mono-olefines. In this instance, also, it is desirable, but not essential, that the selective hydrogenation be carried out at a temperature not greatly higher than that necessary for satisfactorily rapid reaction.

However, in the commercial purification of diolefins, particularly conjugated diolefines, by the present method, it often is desirable to employ a considerable excess of hydrogen, over the amount theoretically required for reduction of the accompanying highly unsaturated hydrocarbon impurities, and to sacrifice a minor amount of the diolefine in order to assure substantially complete removal of the impurities. In all instances, the excess of hydrogen, over the amount required for hydrogenation of the undesired hydrocarbon impurities, is restricted so as not to exceed 10 per cent of the molecular equivalent of the diolefine which is to be purified.

In purifying a diolefine in accordance with the invention, a hydrocarbon mixture comprising a diolefine and one or more of the at least equally unsaturated hydrocarbon impurities hereinbefore mentioned, is treated with hydrogen in the amount stated above and vapors of the resultant mixture are passed at a reaction temperature below 300° C., and preferably below 250° C., over or through a bed of one of the aforementioned granular supported hydrogenation catalysts. If the hydrocarbon mixture under treatment comprises sulphur compounds, these preferably are removed prior to passage over the catalyst, since they tend to poison, i. e. deactivate, the latter. The sulphur compounds may be removed in any of several known ways, e. g. by passing the vapors, at room temperature or above, through a bed of copper oxide or by scrubbing the vapors with an aqueous, or an alcoholic, solution of an alkali metal hydroxide such as sodium or potassium hydroxide, etc.

Heating of the vapors to the reaction temperature may be accomplished in any of several ways, e. g. by external heating of the bed of catalyst or by preheating the vapor mixture before passage over the catalyst. It is preferably accomplished by injecting into the vapor mixture steam which has been superheated sufficiently to bring the resultant mixture to the desired reaction temperature. The steam not only heats the reaction vapors quickly to a substantially uniform temperature, but appears also to aid in preventing the accumulation of carbon or tarry deposits on the catalyst.

However, during continued use in the process the catalyst gradually becomes less active, due apparently to an accumulation of an oily material, presumably polymerized hydrocarbons, on the same. Usually, the catalyst may be employed continuously over a period of several days before sufficient polymerized material is accumulated to reduce greatly its activity.

When the catalyst becomes less active than desired, it is regenerated by discontinuing the flow of the hydrogen and hydrocarbon mixture, sweeping such vapors from the catalyst chamber with steam, and thereafter passing air, or a mixture of steam and air, over the catalyst while heating the latter usually at temperatures of from 400° to 700° C. During such passage of an oxygen-containing gas over the catalyst, any tarry materials in the latter are oxidized and removed and the metals of which the catalyst is composed are in most instances oxidized. Thereafter, the introduction of air is discontinued, the catalyst chamber is swept free of oxygen with steam, and the metal oxides are reduced with hydrogen as hereinbefore described. The catalyst is then in condition for continued use in carrying out the selective hydrogenation reaction.

During passage together with hydrogen over the catalyst in the manner just described, the conjugated diolefines in a hydrocarbon mixture react to only a minor extent, or not at all, but the accompanying hydrocarbons of as great a degree of unsaturation are almost completely hydrogenated. The diolefines thus freed of equally unsaturated hydrocarbon impurities may be separated from the mixture in any of several known ways, e. g. by extraction with selective solvents, or by treatment with chemical agents, such as ammoniacal cuprous chloride, which react to form thermally unstable addition compounds.

The following examples describe a number of ways in which the principle of the invention has been applied, but are not to be construed as limiting the invention.

EXAMPLE 1

In each of a series of experiments, granular Silocel (a porous form of silica) was immersed in an aqueous solution of the nitrates of metals which were to be tested as hydrogenation catalysts. The total concentration of the metal nitrates, and also their relative concentrations, were varied from one experiment to the next in accordance with the proportions of the nitrates which were to be absorbed on the Silocel. The solution was heated, together with the Silocel, on a steam bath for about one hour, after which unabsorbed liquor was decanted from the Silocel and the latter was dried and heated at about 650° C. in contact with air so as to convert the metal nitrates to the corresponding oxides. The granular material was swept free of oxygen with steam, cooled to about 320° C. and, while at approximately said temperature, treated with hydrogen to reduce the metal oxides to the metals. Thereafter, a cracked-oil gas fraction which contained between 50 and 60 per cent by weight of butadiene-1.3, between 38 and 45 per cent of butylenes, and minor amounts of butanes and highly unsaturated hydrocarbons such as methyl-acetylene, ethyl-acetylene, and vinyl-acetylene, etc., was passed, together with hydrogen, in about twice the amount theoretically required to reduce the acetylenes to mono-olefines, over the granular hydrogenation catalyst while heating the latter. The granular catalyst was employed in the form of a bed of 3 centimeters diameter and 40 centimeters depth. The vapor mixture was passed lengthwise through the bed of catalyst at a rate which, when expressed as at 25° C. and atmospheric pressure, corresponded to 625 cubic centimeters per minute. The catalyst was heated initially at a temperature of about 320° C., but during passage of the vapors over the same the temperature was gradually lowered until analysis of the acetylenes in the mixture flowing to the catalyst and of the acetylenes in the vapors flowing from the catalyst indicated that the latter was no longer satisfactorily active. Operation at the "threshold temperature," i. e. the minimum temperature at which the catalyst was satisfactorily active, was continued for a time sufficient to permit determination of the proportion of acetylenes in the hydrocarbon mixture being fed to the catalyst and, also, in the hydrocarbon mixture flowing from the catalyst. The following table gives the composition, in per cent by weight, of each catalyst thus tested and the threshold temperature for the catalyst. It also gives the per cent by weight of acetylenes in the hydrocarbons being fed to the catalyst and in the hydrocarbons flowing from the catalyst when maintaining the latter at the threshold temperature.

Table I

| Run No. | Catalyst | | | Threshold Temp., °C. | Per Cent of Acetylenes in Hydrocarbons Flowing— | |
|---|---|---|---|---|---|---|
| | Silocel, Per Cent | Catalytic Metals | | | To the Catalyst | From the Catalyst |
| | | Kind | Per Cent | | | |
| 1 | 80 | Copper | 20 | (¹) | 2 | 1.8 at 200° C. |
| 2 | 97.9 | Copper / Nickel | 2.01 / 0.018 | 205 | 2.2 | |
| 3 | 79 | Copper / Nickel | 20.9 / 0.067 | 175 | 2.2 | 0.08 |
| 4 | 78.7 | Copper / Nickel | 20.6 / 0.72 | 135 | 1.93 | 0.026 |
| 5 | 75.6 | Copper / Silver | 22.4 / 2.0 | 200 | 2.2 | 0.014 |
| 6 | 79 | Copper / Cadmium | 20 / 1 | 190 | 2.4 | 0.06 |
| 7 | 92.7 | Copper / Titanium | 7.18 / 0.087 | 190 | 2.2 | 0.24 |
| 8 | 76.7 | Copper / Iron | 22.8 / 0.53 | 175 | 2.2 | 0.0 |
| 9 | 89.9 | Copper / Vanadium | 9.29 / 0.84 | 175 | 2.2 | 0.084 |
| 10 | 85 | Copper / Nickel | 7.5 / 7.5 | 150 | 2.26 | 0.014 |
| 11 | 79 | Copper / Zinc | 20 / 1 | 125 | 2.2 | 0.024 |
| 12 | 85 | Iron / Copper | About 14.7 / 0.3 | 230 | 1.93 | 0.10 |
| 13 | 85 | Iron / Nickel | About 14.7 / 0.3 | 225 | 2.4 | 0.44 |

¹ Very slight reaction.

EXAMPLE 2

A number of catalysts were prepared and tested as in Example 1. However, while operating at the threshold temperature, the per cent by weight of acetylenes and also of butadiene-1.3, both in the hydrocarbon mixture being fed to the catalyst and in the hydrocarbon mixture flowing from the catalyst, were determined. Table II states the composition of each catalyst, gives the threshold temperature for the catalyst, and states the per cent by weight of butadiene-1.3 and of acetylenes in the hydrocarbons present both in the vapors flowing to the catalyst and in those flowing from the catalyst.

Table II

| Run No. | Catalyst | | | Threshold Temp., °C | Per Cent of Butadiene-1.3 in Hydrocarbons Flowing— | | Per Cent of Acetylenes in Hydrocarbons Flowing— | |
|---|---|---|---|---|---|---|---|---|
| | Silocel, Per Cent | Catalytic Metals | | | To the Catalyst | From the Catalyst | To the Catalyst | From the Catalyst |
| | | Kind | Per Cent | | | | | |
| 1 | 81.8 | Copper<br>Cobalt | 17.9<br>0.33 | 115 | 52.4 | 51.5 | 2.1 | 0.024 |
| 2 | 87.1 | Copper<br>Molybdenum | 12.1<br>0.85 | 135 | 52.9 | 51.4 | 2.6 | 0.03 |
| 3 | 74.6 | Copper<br>Manganese | 23.9<br>1.44 | 140 | 52.4 | 52.0 | 2.1 | 0.016 |
| 4 | 77.5 | Copper<br>Chromium | 22.2<br>0.27 | 142 | 53.3 | 49.4 | 1.5 | 0.016 |
| 5 | 86.7 | Iron<br>Copper | 12.08<br>1.23 | 193 | 58.0 | 58.0 | 2.26 | 0.014 |

EXAMPLE 3

The purpose of this example is to present data collected during an experiment for the determination of the threshold temperature of a hydrogenation catalyst. The catalyst was one consisting of 78.7 per cent by weight of Silocel, 20.6 per cent copper, and 0.72 per cent nickel. It was prepared as described in Example 1. The granular catalyst was employed in the form of a bed of 3 centimeters diameter and 40 centimeters depth. A cracked-oil gas fraction having the composition stated in Example 1 and containing approximately 2 per cent by weight of acetylenes was admixed with 4 per cent of its volume of hydrogen. The mixture was passed at a rate of 624 cc. per minute (when expressed as at 25° C. and one atmosphere pressure) through the catalyst bed while heating the latter initially at a temperature of 175° C. During passage of the vapors over the catalyst, the temperature was gradually lowered and the per cent by weight of acetylenes in the hydrocarbons flowing from the catalyst was determined at each of a number of different temperatures. The lowest temperature at which the catalyst was highly effective in causing hydrogenation of the acetylenes was considered to be the "threshold temperature." Table III states the temperature for each measurement of the concentration of acetylenes in the hydrocarbons flowing from the catalyst and gives the value determined.

Table III

| Temperature, °C. | Per Cent of Acetylenes in Treated Hydrocarbons |
|---|---|
| 175 | 0.02 |
| 170 | 0.02 |
| 162 | 0.014 |
| 155 | 0.014 |
| 150 | 0.03 |
| 145 | 0.03 |

Table III—Continued

| Temperature, °C. | Per Cent of Acetylenes in Treated Hydrocarbons |
|---|---|
| 140 | 0.02 |
| 135 | 0.026 |
| 125 | 0.14 |
| 110 | 0.32 |
| 105 | 0.42 |

This data indicates that under the conditions employed the threshold temperature was between 125° and 135° C., probably about 130° C.

EXAMPLE 4

A vaporized cracked-oil gas fraction, containing approximately 53 per cent by weight of butadiene-1.3, 40 per cent of butylenes, 4 per cent of butanes, 2 per cent of acetylene compounds such as methyl-acetylene, ethyl-acetylene and vinyl-acetylene, and a minor amount of sulphur compounds, was treated with 4 per cent by volume of hydrogen. The mixture was passed at room temperature first through a bed of Ascarite (a sodium hydroxide and asbestos mixture) and then through a bed of granular cupric oxide for the purpose of removing the sulphur-containing impurities. The gas flowing from the latter bed was passed at a rate of 520 cubic centimeters per minute through a heated bed of 138 grams of a granular catalyst which had been prepared as described in Example 1 and which consisted of 78.7 per cent by weight of Silocel, 20.6 per cent of copper and 0.7 per cent of nickel. During the experiment, the temperature of the catalyst bed was raised gradually from 100° to 205° C. and the percent by weight of the acetylenes remaining in the hydrocarbons flowing from the bed was determined at each of a number of different temperatures. The values determined were:

Table IV

| Temperature, °C. | Residual Acetylenes, per cent |
|---|---|
| 100 | 1.48. |
| 145 | 0.26. |
| 165 | Less than 0.03. |
| 185 | Do. |
| 205 | Do. |

When the temperature had been brought to 205° C., a sample of the hydrocarbons flowing from the bed of catalyst was analyzed to determine the proportions of the different kinds of hydrocarbons present. It was found to have the composition:

| | Percent |
|---|---|
| Butadiene-1.3 | 51.8 |
| Butylenes | 44.5 |
| Butanes | 3.7 |
| Acetylenes | 0.04 |

EXAMPLE 5

A vaporized cracked-oil gas fraction having the composition given in the following table was admixed with 4.68 per cent of its volume of hydrogen and the mixture was scrubbed at room temperature with an aqueous sodium hydroxide solution of 15 per cent concentration in order to remove the sulphur-containing impurities. The gaseous mixture was dried by pasasge through a bed of flaked sodium hydroxide. It was then passed at a rate (expressed as at 25° C. and atmospheric pressure) of 2.617 liters per minute through a heated bed of a granular hydrogenation catalyst which was composed of approximately 80 per cent by weight of Silocel, 19 per cent of copper and 1 per cent of nickel and which had been prepared as described in Example 1. The catalyst bed was of 3 centimeters diameter and 40 centimeters length. It contained 185 grams of the catalyst. During passage of the gases over the catalyst, the latter was heated at temperatures of from 145° to 173° C. The hydrocarbon mixture which had been passed over the heated catalyst was collected and analyzed. The following table gives the analysis of the hydrocarbon mixture both before and after the treatment.

Table V

| Component | Volume Per Cent in Feed | Volume Per Cent in Product |
|---|---|---|
| Propylene | 90.20 | 94.03 |
| Propane | 3.09 | 2.98 |
| Methyl-acetylene | 3.17 | 0.00 |
| Propadiene | 1.68 | 0.54 |
| Ethane | 1.16 | 0.90 |
| Ethylene | 0.00 | 0.02 |
| Sulphur Compounds (expressed as $H_2S$) | 0.52 | 0.00 |
| Carbon dioxide | 0.18 | 0.00 |
| Nitrogen | 0.00 | 0.57 |
| Oxygen | 0.00 | 0.20 |

It will be noted that the methyl-acetylene was completely hydrogenated, whereas a considerable portion of the propadiene was not reduced. Apparently, the nitrogen and oxygen in the treated mixture had been introduced during collection of the sample for analysis.

The method and catalysts herein described have also been employed in freeing the conjugated diolefines, i. e. isoprene and piperylene, in the C₅ fraction of cracked-oil gas of other hydrocarbons of as great or greater degree of unsaturation. In this instance, the highly unsaturated hydrocarbons which are removed by selective hydrogenation include acetylenic hydrocarbons such as ethyl-acetylene, vinyl-acetylene, pentynes and possibly hexynes.

Other modes of applying the principles of the invention may be employed instead of those explained, change being made as regards the method or catalysts herein disclosed providing the steps or ingredients stated by any of the following claims or the equivalent of such stated steps or ingredients be employed.

I therefore particularly point out and distinctly claim as my invention:

1. A method of treating a vaporized hydrocarbon mixture comprising a diolefine and a different alpha·beta-unsaturated hydrocarbon, having no hydrogen atom on the beta carbon atom and having a degree of unsaturation as great as that of the diolefine, to remove said alpha·beta-unsaturated hydrocarbon having no hydrogen on the beta carbon atom without destruction of more than a minor amount of the diolefine, which comprises passing the hydrocarbon mixture together with sufficient hydrogen to reduce the alpha·beta-unsaturated hydrocarbon having no hydrogen atom on the beta carbon atom but insufficient also to reduce as much as 10 per cent of the diolefine over a granular catalyst consisting essentially of between 85 and 99.9 per cent by weight of copper intimately admixed with between 15 and 0.1 per cent of a different metal, the oxide of which is reducible to the metal with hydrogen at temperatures below 550° C., both of said metals being dispersed on an inert porous supporting material, while heating the vapors in the presence of the catalyst at a reaction temperature below 300° C.

2. The method, as described in claim 1, wherein the catalyst consists essentially of an intimate mixture of between 90 and 97 per cent of finely divided copper and between 10 and 3 per cent of a different finely divided metal, the oxide of which is reducible to the metal by hydrogen at temperatures below 550° C.

3. The method, as described in claim 1, wherein the reaction vapors are passed over the catalyst while at a reaction temperature between 100° and 250° C. and the catalyst consists essentially of an intimate mixture of between 90 and 97 per cent by weight of finely divided copper and between 10 and 3 per cent of a different finely divided metal, the oxide of which is reducible to the metal by hydrogen at temperatures below 500° C.

4. A method, as described in claim 1, wherein the hydrocarbon mixture employed as a starting material comprises butadiene-1.3 and a homologue of acetylene that tends to distill therewith, the catalyst consists essentially of an intimate mixture of between 90 and 97 per cent by weight of finely divided copper and between 10 and 3 per cent of a different finely divided metal, the oxide of which is reducible to the metal by hydrogen at temperatures below 550° C., the hydrogen is employed in an amount sufficient to reduce the acetylene but insufficient also to reduce as much as 10 per cent of the butadiene-1.3, and during contact with the catalyst the reaction vapors are heated at a reaction temperature between 100° and 250° C.

5. In a method of treating a fraction of cracked-oil gas, which comprises a conjugated diolefine and a minor amount of a different but at least equally unsaturated hydrocarbon having no hydrogen on the beta carbon atom and that tends to distill together with the conjugated diolefine, to remove said unsaturated hydrocarbon other than the conjugated diolefine, the steps of treating the vaporized mixture with hydrogen in amount sufficient to reduce the hydrocarbon other than the conjugated diolefine which is as unsaturated as the latter but in amount insufficient also to reduce as much as 10 per cent of the conjugated diolefine, passing the resultant mixture at a reaction temperature between 100° and 250° C. over a hydrogenation catalyst consisting essentially of a dispersion on an inert porous material of between 90 and 97 parts by weight of finely divided copper intimately admixed with between 10 and 3 parts of a different finely divided metal, the oxide of which is reducible to the metal by hydrogen at temperatures below 550° C.

6. The method, as described in claim 5, wherein the hydrocarbon mixture is rendered substantially free of sulphur compounds before being passed over the catalyst.

7. In a method of treating a fraction of cracked oil gas, which fraction comprises a conjugated diolefine and a minor amount of a different, but at least equally unsaturated hydrocarbon, having no hydrogen on the beta carbon atom, that tends to distill together with the conjugated diolefine, and which fraction is substantially free of acetylene and sulphur compounds, to remove from the fraction said unsaturated hydrocarbon other than the conjugated diolefine, the steps of treating the vaporized mixture with hydrogen in amount sufficient to reduce the hydrocarbon other than the conjugated diolefine which is as unsaturated as the latter, but in amount insufficient also to reduce as much as 10 per cent of the conjugated diolefine, and passing the resultant mixture at a reaction temperature between 100° and 250° C. over a hydrogenation catalyst consisting essentially of an intimate mixture of between 90 and 97 parts by weight of finely divided copper and between 10 and 3 parts of finely divided nickel, the mixture of these metals being supported on an inert porous material.

LUDO K. FREVEL.

REFERENCES CITED

The following references are of record in the file of this patent:

UNITED STATES PATENTS

| Number | Name | Date |
| --- | --- | --- |
| 2,267,753 | Ruthardt | Dec. 30, 1941 |
| 2,359,759 | Hebbard et al. | Oct. 10, 1944 |
| 1,836,927 | Linckh et al. | Dec. 15, 1931 |
| 2,391,004 | Breuer | Dec. 18, 1945 |

OTHER REFERENCES

Article in J. A. C. S., vol. 64, pages 363 to 366, February 1942, by Thompson et al.